June 10, 1930.  H. KREISINGER  1,762,338
GAS WASHER
Filed Oct. 10, 1927   4 Sheets-Sheet 2

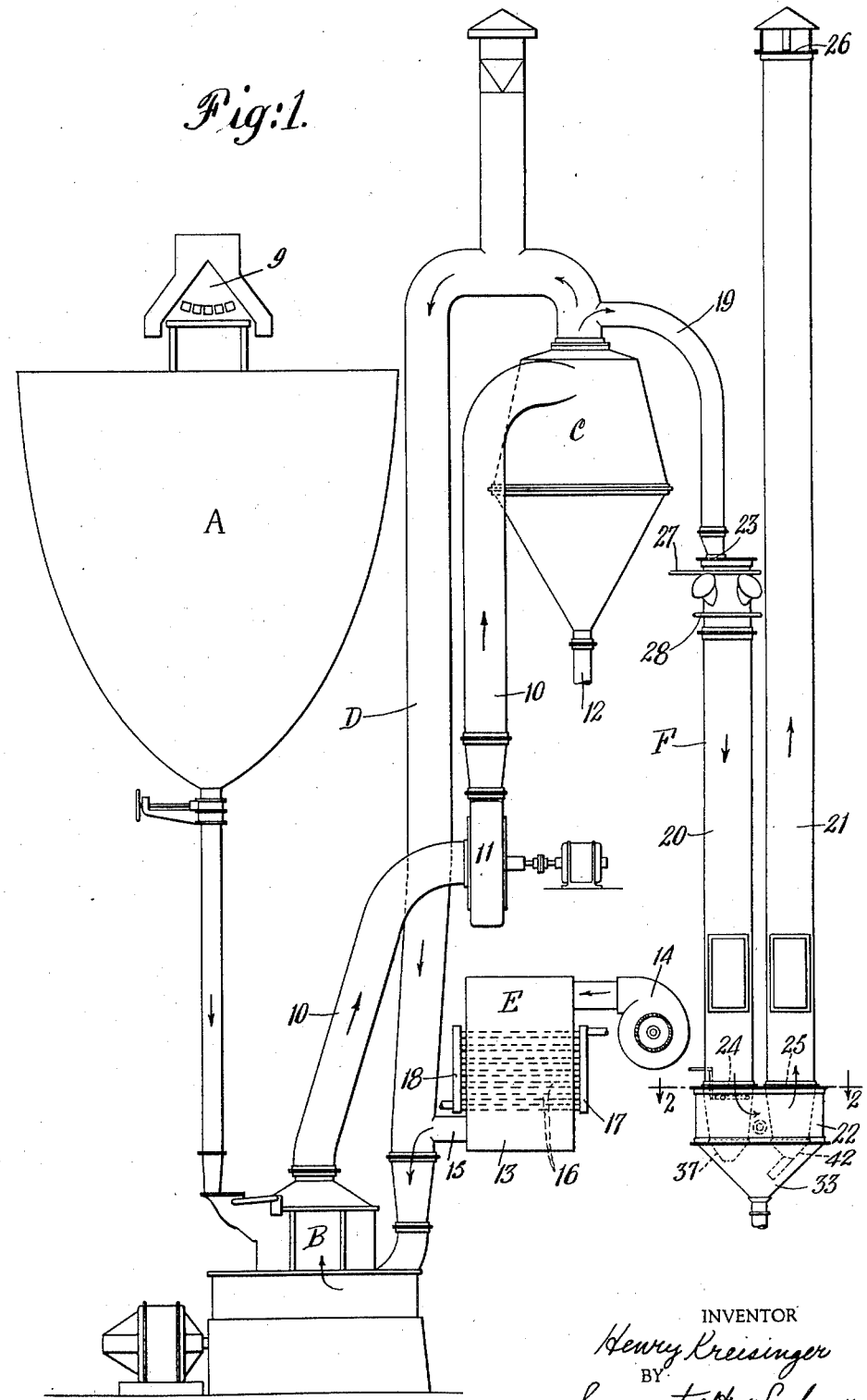

INVENTOR
Henry Kreisinger
BY
Synnestvedt & Lechner
ATTORNEYS

June 10, 1930. H. KREISINGER 1,762,338
GAS WASHER
Filed Oct. 10, 1927 4 Sheets-Sheet 3

INVENTOR
Henry Kreisinger
BY
Synnestvedt + Lechner
ATTORNEYS

June 10, 1930.  H. KREISINGER  1,762,338
GAS WASHER
Filed Oct. 10, 1927   4 Sheets-Sheet 4
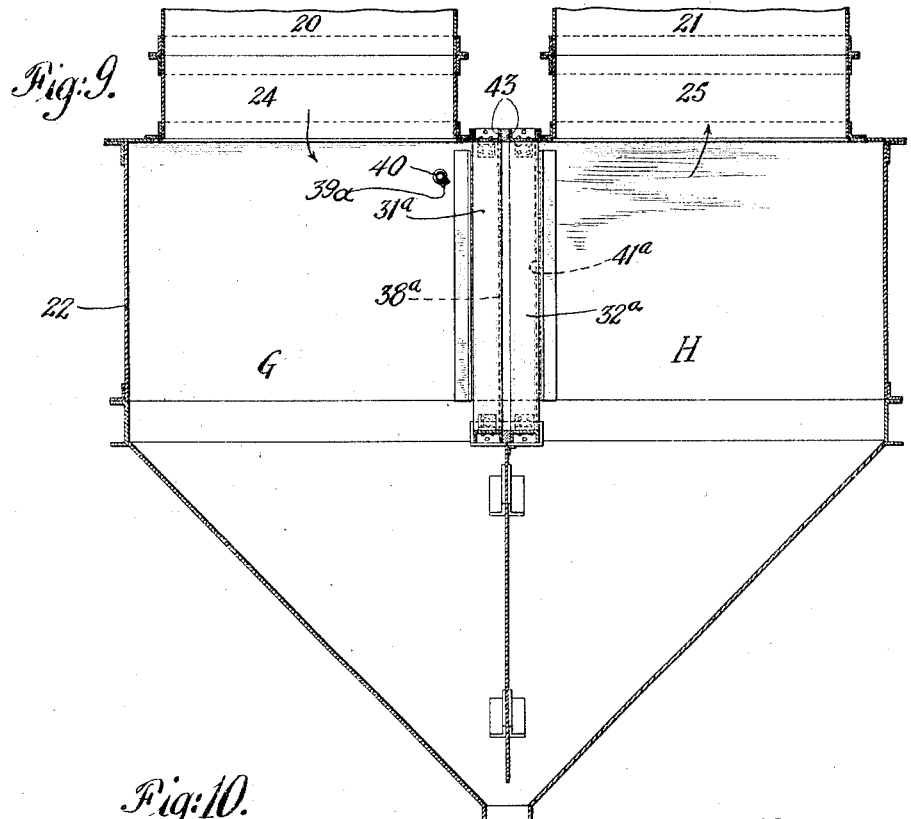
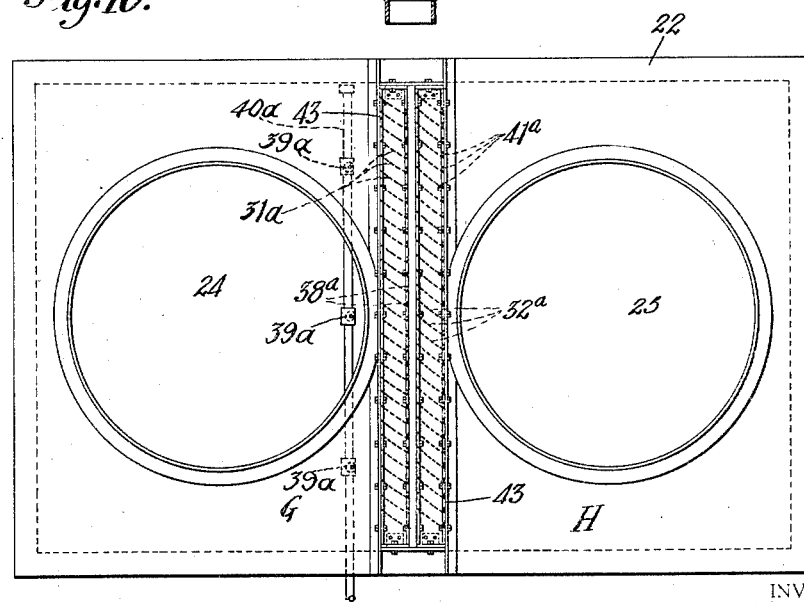
INVENTOR
Henry Kreisinger
BY
Symmestvedt + Lechner
ATTORNEYS Patented June 10, 1930

1,762,338

UNITED STATES PATENT OFFICE

HENRY KREISINGER, OF PIERMONT, NEW YORK, ASSIGNOR TO INTERNATIONAL COMBUSTION ENGINEERING CORPORATION, OF NEW YORK, N. Y., A CORPORATION OF DELAWARE

GAS WASHER

Application filed October 10, 1927. Serial No. 225,054.

This invention relates to gas washers, i. e., to devices for removing foreign matter, such as dust, from gases such as air, flue gas and the like, which are to be vented to the atmosphere.

The invention is especially useful in connection with pulverized fuel preparation plants and particularly to plants employing air lift or transporting means.

In such systems a certain amount of the air employed has to be vented from the system, as will appear hereinafter, and because of this, certain difficulties are encountered in that dust is carried off with the vented air or gas.

The primary object of my invention is to provide a simple and effective device for overcoming such difficulties.

More specifically stated, it is an object of my invention to provide a washer for freeing gas, which is to be vented to the atmosphere, of dust.

How the foregoing, together with such other objects and advantages as may hereinafter appear, or are incident to my invention, are realized is illustrated in preferred form in the accompanying drawings, wherein—

Fig. 1 is a side elevation of a pulverized fuel preparing system illustrating a gas washer constructed in accordance with my invention associated therewith;

Fig. 9 is a fragmentary sectional view similar to Fig. 3, but illustrating a modification of my invention.

Fig. 10 is a plan view of Fig. 9 with the stacks removed.

Figure 3:
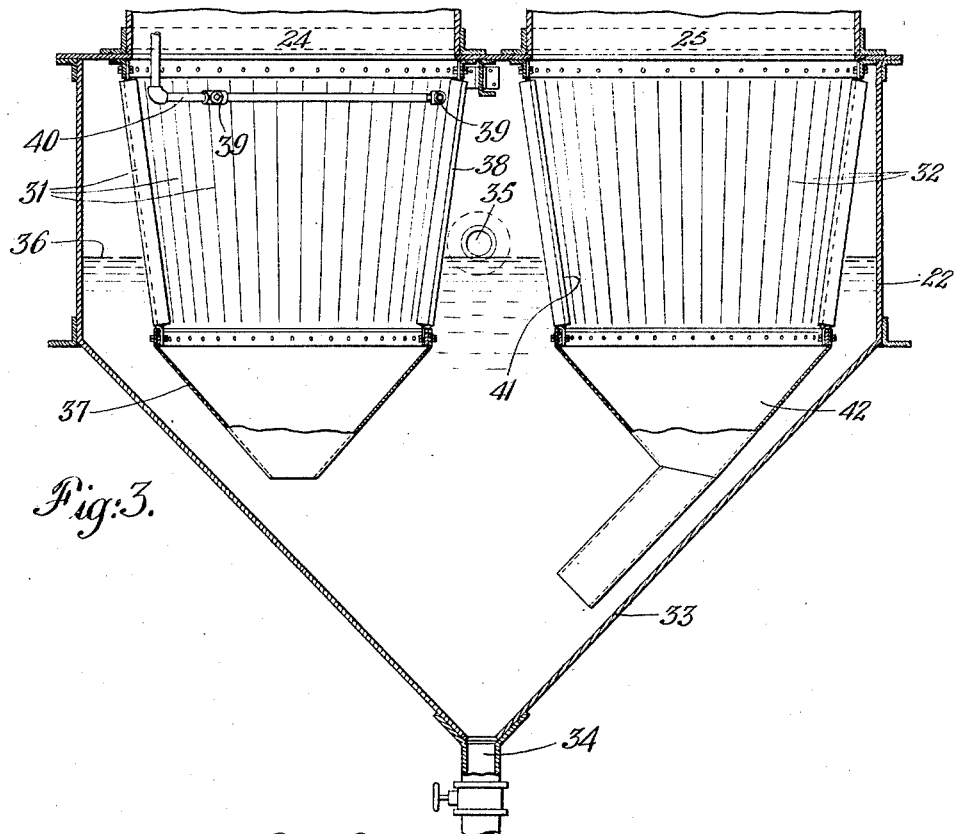
Fig. 3 is a fragmentary section taken on the line 3—3 of Fig. 2.

Referring to the drawings, the system illustrated in Fig. 1, in connection with which my invention is illustrated, comprises in general a crushed coal bin A to which the coal is fed as by means of conveyor mechanism 9; a pulverizer mill B gravity fed from the bin A; a cyclone separator C to which coal pulverized in the mill is led by means of an air lift comprising a pipe line 10 and a fan 11; a return line D for returning to the mill air separated from the coal in the separator and a heating device E for introducing heated air or gas into the system. The coal collected in the cyclone separator is discharged through the pipe 12 which may lead to a bin.

The device E for introducing heated air into the system comprises a heater casing 13 into which the air is fed as by means of the fan 14; a delivery pipe 15 leading from the casing to the return pipe D; and means for heating the air in this instance comprising a plurality of steam pipes 16 connected at their ends into headers 17 and 18 one of which has a steam inlet and the other a steam outlet.

The hot air from the heater device E is preferably introduced into the return line at a point relatively close to the mill B. The introduction of this hot air to the mill causes the mill to function as a dryer.

A pipe 19 is provided for leading off an amount of the air from the return line substantially equivalent to the amount of air introduced into this system through the device E. This prevents the system from becoming moisture laden and also enables the mill to function as a dryer.

As this air or gas carries with it a certain amount of dust which if discharged directly into the atmosphere with the gas would be objectionable, I have provided what may be termed a gas washer F for washing or freeing the gas of dust, the inlet end of which has the pipe 19 connected thereto.

The gas washer F comprises in general two upright pipes or stacks 20 and 21 connected at their lower ends by a casing 22, the pipe 20 having an upper gas inlet 23 and a lower gas outlet 24 and the pipe 21 having a lower gas inlet 25 and an upper gas outlet 26. Stated in another way, the washer casing may be said to be a conduit having a down-flow section or portion 20, an upflow section 21 and a connecting section 22.

Figure 4:
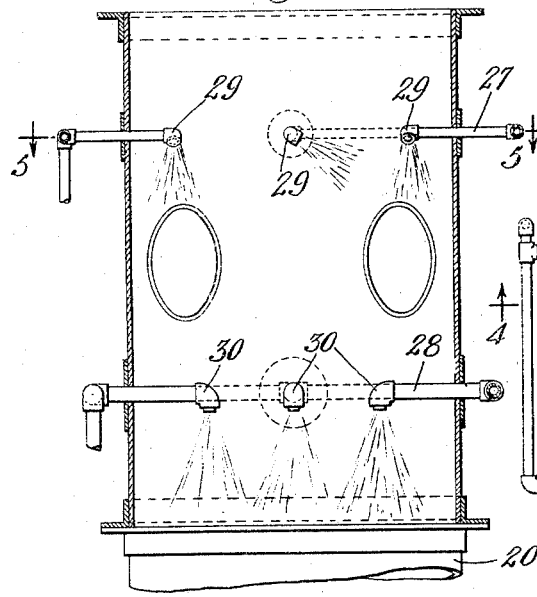
Fig. 4 is a fragmentary sectional view through the gas inlet portion of the washer, the section being taken substantially on the line 4—4 of Fig. 5 with certain piping appearing in elevation.
Figure 5:
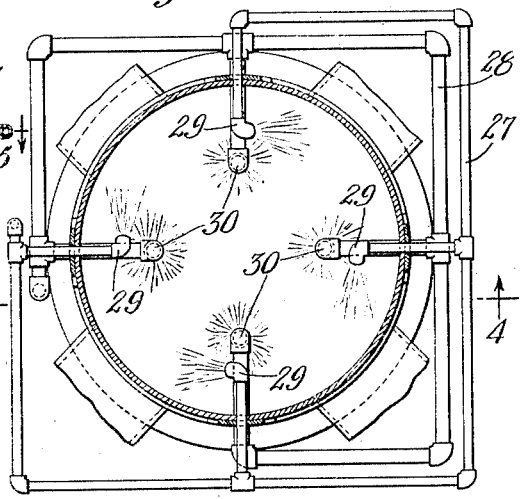
Fig. 5 is a plan section taken on the line 5—5 of Fig. 4 with the piping lying in the plane of the section appearing in full view.
Figure 8:
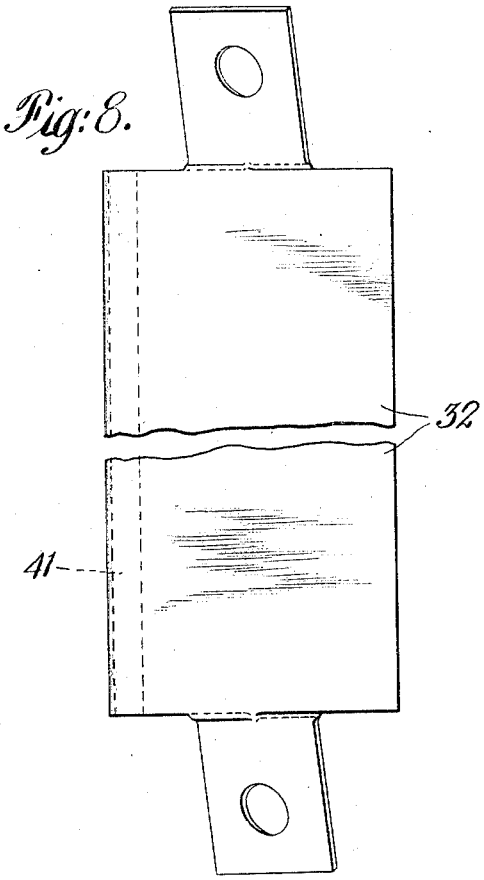
Figs. 6, 7 and 8 are enlarged views showing certain vanes which I employ in detail.
Figure 6:
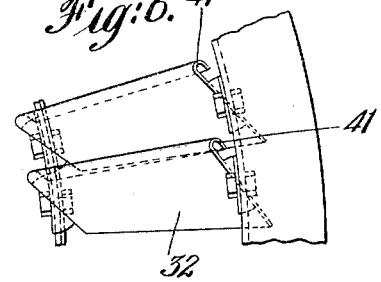
Figure 7:
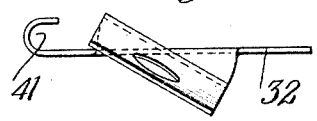

Water and steam are introduced into the upper portion of the downflow section 20, preferably as near to the top thereof as possible, by means of the steam piping 27 and the water piping 28, the piping 27 being provided with a plurality of spray nozzles 29 (Figure 4) and the piping 28 being provided with a plurality of spray nozzles 30 for injecting water and steam sprays into the gas flowing through the washer (see Figs. 4 and 5). In connection with the steam nozzles, it is to be observed that they may be set at an angle so as to produce a swirling steam spray, thus better effecting inter-mixture of the steam and gas. The water spray introduced by means of the nozzles 30 in addition to condensing the steam and thus causing the dust particles in the gases to become thoroughly saturated also serves to flush the washer. From the foregoing it will be seen that the dust particles or foreign matter are caused to precipitate out of the air or gas passing downwardly through the stack or section 20.

Figure 2:
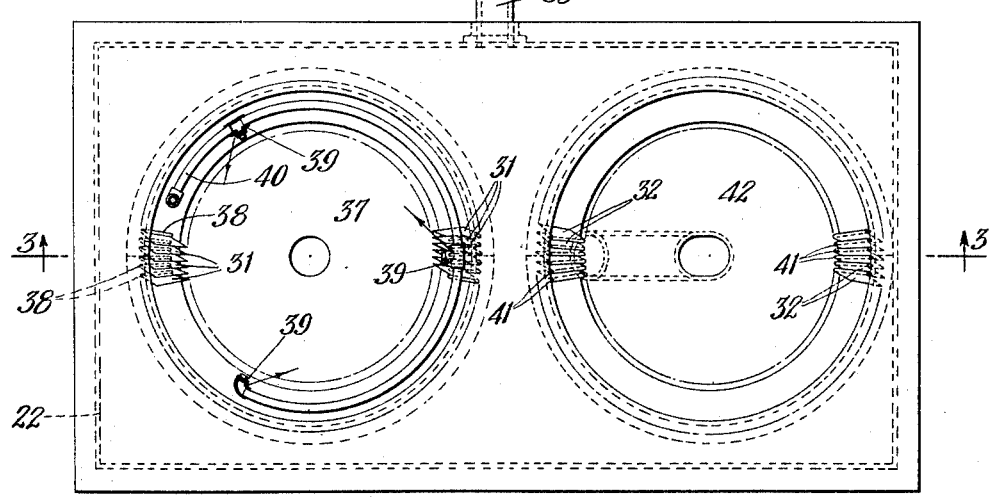
Fig. 2 is a plan section of the lower portion of the washer taken on the line 2—2 of Fig. 1.

Referring now more particularly to Figs. 2 and 3, I have arranged a plurality of spaced louvers or vane-like members 31 around the gas outlet 24 of the pipe 20 and similar members 32 around the gas inlet 25 of the pipe 21 for a purpose presently to appear. These members are located within the connecting casing 22, which casing has a hopper shaped bottom 33 and a valve controlled outlet 34 constituting a receptacle for the water and condensate. An overflow pipe 35 is provided for maintaining a predetermined level of water in the casing 22, the level being somewhat above the bottom of the upright louvers above mentioned as indicated at 36 in Fig. 3. Thus, an annular cage or throat for the pipe 20 is provided by the louvres 31 and one for the pipe 21 by the louvres 32, the bottom of the cages being formed by the water in the casing 22.

The gases from the downflow section pass outwardly between the louvres or vanes 31 into the casing 22 and in changing their direction, some of the foreign matter gravitates to the conical bottom 37 of the cage, some lodges on the faces of the louvres, and some is caught in the hooked edges or gutters 38 of the louvres. The matter thus lodging finally finds its way into the conical portion 37, from whence it discharges into the bottom of the casing 22. In order to prevent the cage from plugging, I propose to spray the cage with water as may be required as by means of the nozzles 39 of the water piping 40. The residue may be removed from the casing 22 by means of the valve controlled outlet 34.

The gas passes from the casing 22 into the pipe or discharge stack 21, and, as it may still contain some foreign matter, I have provided a similar cage around the inlet to this stack as above pointed out. It is to be noted, however, that the gutters 41 on the louvres 32 of this inlet cage or throat are at the inner edges thereof so as to catch the matter trying to enter the cage. This cage is provided with a conical bottom 42 from which the sludge discharges into the bottom of the casing 22. A water spray may also be associated with this cage if desired. In connection with the louvres 31 and 32 it is to be noted that they are preferably somewhat inclined, thereby providing cages which are frusta-conical in shape.

In the modification illustrated in Figs. 9 and 10, instead of arranging the vanes or louvres 31 and 32 in the form of an annular cage, I have arranged louvres 31$^a$ and 32$^a$ in the form of two upright partitions of flat screens. These partitions extend across the casing 22 and are located between the outlet 24 and the inlet 25, thus dividing the casing into two communicating chambers G and H, the chamber G receiving gas from the stack 20 and the chamber H receiving gas cleared of foreign matter, by the louvres 31$^a$ and 32$^a$ from the chamber H, and discharging it into the discharge stack 21. The louvres are provided with hooked or guttered edges 38$^a$ and 41$^a$ for catching foreign matter. It is to be noted that the louvres or vanes preferably are curved and set at an angle (see Fig. 10).

In order that the partitions formed may be readily removed, I provide openings 43 in the top of the casing 22. These partitions may be assembled outside of the casing before inserting them and may easily be lifted out for repairs, thus making it unnecessary to do the repair work inside the casing. Another advantage of this construction is that if any work is to be done inside of the casing, the louvre-like units can be lifted out of the casing to give ample room inside to carry on the work.

The vanes or louvres may be cleaned by means of a water spray issuing from the nozzles 39$^a$ of the piping 40$^a$.

An air washer constructed in accordance with my invention functions to substantially remove all of the foreign matter from the air or gas prior to its entrance into the discharge or vent stack so that the gas finally leaving the washer through the outlet 26 is dust free.

I claim:—

A gas washer including an upright casing having a gas inlet at the top and a gas outlet at the bottom, a plurality of upright spaced vanes circularly disposed around said gas outlet, means for spraying water and steam into said casing, a second casing into which the gas is discharged from said upright casing, said second casing having a portion constituting a water receptacle, and means for maintaining a level of water in said receptacle above the lower ends of the aforesaid vanes.

In testimony whereof I have hereunto signed my name.

HENRY KREISINGER.